United States Patent
Takahashi et al.

(10) Patent No.: US 7,371,276 B2
(45) Date of Patent: May 13, 2008

(54) TITANIUM DIOXIDE PIGMENT AND METHOD FOR PRODUCING THE SAME AND RESIN COMPOSITION USING THE SAME

(75) Inventors: Hideo Takahashi, Yokkaichi (JP); Toshihiko Akamatsu, Yokkaichi (JP); Kazuhiro Tominaga, Yokkaichi (JP); Taku Katou, Yokkaichi (JP); Yoshio Nagai, Yokkaichi (JP); Yoshitaka Muraki, Yokkaichi (JP); Yukako Ota, Yokkaichi (JP)

(73) Assignee: Ishihara Sangyo Kaisha, Ltd., Osaka (JP)

( * ) Notice: Subject to any disclaimer, the term of this patent is extended or adjusted under 35 U.S.C. 154(b) by 0 days.

(21) Appl. No.: 10/523,589

(22) PCT Filed: Aug. 6, 2003

(86) PCT No.: PCT/JP03/10027

§ 371 (c)(1),
(2), (4) Date: Apr. 8, 2005

(87) PCT Pub. No.: WO2004/024832

PCT Pub. Date: Mar. 25, 2004

(65) Prior Publication Data

US 2005/0228112 A1    Oct. 13, 2005

(30) Foreign Application Priority Data

Aug. 7, 2002   (JP) ............................ 2002-230502

(51) Int. Cl.
  C08K 3/22   (2006.01)
  C09C 1/36   (2006.01)
  C09D 11/00  (2006.01)

(52) U.S. Cl. ............... 106/443; 106/287.19; 106/444; 423/610; 423/614; 423/615

(58) Field of Classification Search ........... 106/436, 106/447, 443, 438, 441, 442, 444, 287.19; 524/497; 423/274, 610, 611, 612, 613, 614, 423/615, 616
See application file for complete search history.

(56) References Cited

U.S. PATENT DOCUMENTS

| | | | | |
|---|---|---|---|---|
| 5,030,439 A | * | 7/1991 | Brownbridge | 423/610 |
| 5,147,629 A | * | 9/1992 | Robb et al. | 423/612 |
| 5,173,386 A | * | 12/1992 | Murasawa | 430/84 |
| 5,236,989 A | * | 8/1993 | Brown et al. | 524/413 |
| 5,264,033 A | * | 11/1993 | Noda et al. | 106/447 |
| 5,468,463 A | * | 11/1995 | Butje et al. | 423/612 |
| 5,630,995 A | * | 5/1997 | Foulger et al. | 423/616 |
| 5,714,431 A | * | 2/1998 | Gupta et al. | 502/400 |
| 5,776,239 A | * | 7/1998 | Bruno | 106/437 |
| 5,853,887 A | * | 12/1998 | Yoshimoto et al. | 428/404 |
| 5,972,835 A | * | 10/1999 | Gupta | 502/439 |
| 5,973,175 A | * | 10/1999 | Bruno | 556/56 |
| 6,001,326 A | * | 12/1999 | Kim et al. | 423/598 |
| 6,187,438 B1 | * | 2/2001 | Chopin et al. | 428/403 |
| 6,306,361 B1 | * | 10/2001 | Shin et al. | 423/610 |
| 6,328,947 B1 | * | 12/2001 | Monden et al. | 423/611 |
| 6,440,383 B1 | * | 8/2002 | Duyvesteyn et al. | 423/611 |
| 6,548,039 B1 | * | 4/2003 | Duyvesteyn et al. | 423/610 |
| 2005/0061205 A1 | * | 3/2005 | Kobayashi et al. | 106/415 |

FOREIGN PATENT DOCUMENTS

| | | |
|---|---|---|
| CN | 1135459 A | 9/1996 |
| CN | 1169957 A | 7/1997 |
| EP | 949302 | 10/1999 |
| JP | 5-51210 | 3/1993 |
| JP | A 5-51210 | 3/1993 |
| JP | 05-246717 | 9/1993 |
| JP | 8-225324 | 9/1996 |
| JP | 09-165501 | 6/1997 |
| JP | 9-188518 | 7/1997 |
| JP | 11-11948 | 1/1999 |
| JP | 2002-503620 | 8/1999 |
| JP | 11-335542 | 12/1999 |
| JP | 2001-10002 | 1/2001 |
| JP | 2002-154824 | 5/2002 |
| WO | WO 97/02488 | 7/1997 |

* cited by examiner

Primary Examiner—Karl E Group
(74) Attorney, Agent, or Firm—Paul E. White; Manelli Denison & Selter PLLC

(57) ABSTRACT

The titanium dioxide pigment of the present invention contains an anatase type crystal in an amount of 98-100% and has an average particle diameter of 0.2-0.4 μm and a whiteness of 95-97 in terms of L value of linseed oil. The titanium dioxide pigment of the present invention has characteristics peculiar to anatase type, for example, optical characteristics such as bluish color tone and physical characteristics such as low hardness, and furthermore has high opacity which is not possessed by conventional anatase type titanium oxide pigments.

2 Claims, No Drawings

TITANIUM DIOXIDE PIGMENT AND METHOD FOR PRODUCING THE SAME AND RESIN COMPOSITION USING THE SAME

TECHNICAL FIELD

The present invention relates to an anatase type titanium dioxide pigment excellent in opacity, a method for production thereof, and a resin composition comprising the same.

BACKGROUND ART

Titanium dioxide is used as white pigments in a wide variety of the fields such as paints, inks, plastics and papers, and those which are commercially available at present are roughly classified into anatase type and rutile type according to their crystalline forms. Those of anatase type have the features of higher reflectance for light of short wavelength (showing bluish color tone), smaller absorption of light of ultraviolet portion, lower hardness, lower dielectric constant, and smaller specific gravity as compared with those of rutile type, but are inferior in basic properties of pigments, namely, smaller in refractive index for visible light and lower in opacity than those of rutile type. Thus, the features of anatase type titanium dioxide are not sufficiently utilized. The pigment concentration used in resin compositions which require high opacity is usually not less than 0.5 part by weight of titanium dioxide pigment for 1 part by weight of resin component in the case of paints, inks or the like, and usually not less than 0.05 part by weight in the case of plastics or the like. Commercially available anatase type titanium dioxide pigments have an average particle diameter in the range of 0.1-0.18 µm, and the reason for the anatase type titanium dioxide pigments being low in opacity is that the particle diameter is too small as compared with optimum particle diameter which can give theoretically the highest opacity, although the reason might be due to the basic property that anatase type titanium dioxide pigments are low in refractive index for visible light as mentioned above.

As a method for producing anatase type titanium dioxide pigments having an average particle diameter of not less than 0.2 µm, there is known a method which comprises adding to hydrous titanium oxide a potassium oxide corresponding to 0.2-0.6% by weight calculated as $K_2O$ based on the weight of $TiO_2$ in the hydrous titanium oxide and a phosphorus oxide corresponding to 0.15-0.55% by weight calculated as $P_2O_5$ as calcination treating agents, preferably further adding an aluminum compound in an amount of not less than 0.2% by weight calculated as $Al_2O_3$, and calcining the mixture with heating by gradually raising the temperature from 460° C. to 1020° C. over a certain period of time (JP-A-8-225324). Furthermore, there is known another method which comprises adding to hydrous titanium oxide an aluminum compound corresponding to 0.1-0.5% by weight calculated as $Al_2O_3$, a potassium compound corresponding to 0.1-0.7% by weight calculated as $K_2O$ and a phosphorus compound corresponding to 0.2-1% by weight calculated as $P_2O_5$ based on the weight of $TiO_2$ in the hydrous titanium oxide as calcination treating agents, and calcining the mixture by heating at 1000° C. or higher (JP-A-9-188518).

DISCLOSURE OF INVENTION

However, according to the method of JP-A-8-225324, sufficient whiteness as white pigments cannot be obtained, and according to the method of JP-A-9-188518, since the calcination temperature is high, and a part of crystals of anatase type titanium dioxide is converted to rutile type during the calcination with heating, the resulting pigment contains about 2-8% by weight of rutile type titanium dioxide, and hence the features of anatase type can hardly be obtained, and, furthermore, sintering is apt to occur between particles, and titanium dioxide pigments excellent in dispersibility can hardly be obtained. The present invention solves the above-mentioned problems and provides anatase type titanium dioxide pigments excellent in opacity, a method for producing the pigments, and a resin composition comprising the same.

As a result of intensive research conducted by the inventors in an attempt to solve the above problems, it has been found that when an aluminum compound, a potassium compound and a phosphorus compound are used as calcination treating agents, and amounts of these compounds and the ratio of the potassium compound and the phosphorus compound are in specific ranges, anatase type titanium dioxide pigments great in particle diameter and excellent in whiteness can be obtained at a calcination temperature lower than 1000° C. It has further been found that when the resulting titanium dioxide pigments are used in resin compositions, the compositions show excellent opacity and have characteristics of anatase type which are not possessed by rutile type titanium dioxide pigments. Thus, the present invention has been accomplished.

That is, the present invention includes (1) a titanium dioxide pigment, characterized in that it contains an anatase type crystal in an amount of 98-100% and has an average particle diameter in the range of 0.2-0.4 µm and a whiteness in the range of 95-97 in terms of L value of linseed oil, (2) a method for producing an anatase type titanium dioxide pigment by calcination of hydrous titanium oxide with heating, characterized in that an aluminum compound corresponding to 0.02-0.2% by weight calculated as $Al_2O_3$, a potassium compound corresponding to 0.2-1% by weight calculated as $K_2O$ and a phosphorus compound corresponding to 0.02-0.5% by weight calculated as $P_2O_5$ based on the weight of $TiO_2$ in the hydrous titanium oxide with $K_2O/P_2O_5$ being in the range of 1.5/1-10/1 are used as calcination treating agents, and the hydrous titanium oxide is calcined by heating at a temperature of not lower than 800° C. and lower than 1000° C. in the presence of the above calcination treating agents, and (3) a resin composition comprising the above titanium dioxide pigment.

The titanium dioxide pigment of the present invention has characteristics peculiar to anatase type, for example, optical characteristics such as bluish color tone and physical characteristics such as low hardness, and furthermore has high opacity not possessed by the conventional anatase type titanium oxide pigments, and hence is useful in various resin compositions, particularly, those which contain resins for paints, inks, plastics or the like.

BEST MODE FOR CARRYING OUT THE INVENTION

The titanium dioxide pigment of the present invention is characterized by containing an anatase type crystal in an amount of 98-100% and having an average particle diameter in the range of 0.2-0.4 µm and a whiteness in the range of 95-97 in terms of L value of linseed oil. In the present invention, the average particle diameter is specified in the above-mentioned range which is most suitable for the pigment concentration used in a resin composition which requires high opacity (e.g., not less than 0.5 part by weight of titanium dioxide pigment for 1 part by weight of resin component in the case of paints, inks or the like, and not less than 0.05 part by weight of titanium dioxide pigment in the case of plastics or the like), whereby excellent opacity is imparted to an anatase type titanium dioxide pigment which is inherently low in refractive index. The titanium dioxide pigment of the present invention has a whiteness of 95-97 expressed by L value of linseed oil. Furthermore, in the field of plastics in which shear force is hardly exerted at the time of processing, dispersion of titanium dioxide pigment is more difficult with increase of the pigment concentration as compared with paints and inks, while the titanium dioxide pigment of the present invention is large in particle diameter and small in surface energy, and hence is superior in dispersibility.

If the content of the anatase type crystal is lower than the above range, it becomes difficult to develop the features of anatase type titanium dioxide, such as bluish color tone, absorptive power for ultraviolet portion, hardness, etc. If the average particle diameter is smaller than the above range, not only the desired effects cannot be obtained, but also the surface energy increases to cause deterioration of dispersibility. Even if the average particle diameter is increased to larger than the above range, further improvement of the opacity is not recognized, and rather reflectance for light of short wavelength which is one of the features of anatase type decreases, resulting in yellowish color tone. More preferred range of average particle diameter is 0.2-0.3 μm. Particularly, when the width of particle size distribution is narrow, the desired effects can be readily obtained, and in the present invention, it is especially preferred that particles having a particle diameter in the range of 0.2-0.4 μm are contained in 50-100% by weight, more preferably 60-100 wt %. In the present invention, content of rutile type crystal (R(%)) is obtained by X-ray diffraction, and 100-R (%) is taken as a content of anatase type titanium dioxide. Furthermore, the average particle diameter is a cumulative 50% particle diameter of primary particles which is measured by electron microscopy, and the primary particles mean particles of minimum unit which are hardly disintegrated by mechanical methods which are often industrially employed.

The surface of the titanium dioxide pigment of the present invention may not be coated, but is preferably coated with some inorganic compound since anatase type titanium dioxide is high in photocatalytic activity and low in light resistance and weathering resistance. Furthermore, since titanium dioxide pigment is hydrophilic, it is preferably further coated with an organic compound in order to impart a high affinity for the resin component.

As the inorganic compounds which can be used for coating the surface of the titanium dioxide pigment of the present invention, mention may be made of, for example, aluminum compounds, silicon compounds, zirconium compounds, tin compounds, titanium compounds, antimony compounds, etc. One of these compounds may be coated or two or more of them may be coated in combination by coating them in the form of laminate or as a mixture of them. More preferably, the inorganic compounds are at least one compound selected from oxides, hydroxides, hydrated oxides, and phosphate salts. It is known that the coating layer of the inorganic compounds can be made porous or dense by controlling the conditions of coating treatment, such as pH and temperature, and the state of the coating layer is also not particularly limited in the present invention. The coating amount of the inorganic compound is about 0.05-15% by weight, although it depends on use of the resin composition and kind of the inorganic compound. More preferably, it is 0.1-15% by weight in the case of titanium dioxide pigment used for paint compositions or ink compositions and 0.05-5% by weight in the case of titanium dioxide pigment used for plastics compositions. The above coating amount is expressed in terms of oxide in the case of oxides, hydroxides and hydrated oxides (e.g., calculated as $Al_2O_3$ in the case of hydroxide of aluminum), and in terms of phosphate in the case of phosphate salts (e.g., calculated as $AlPO_4$ in the case of aluminum phosphate).

The inorganic compounds used for coating of surface are preferably compounds of silicon, zirconium, tin or antimony, and desirably hydrated oxides thereof. The hydrated oxides of silicon are preferably coated in the dense state from the viewpoint of weathering resistance. The hydrated oxides of aluminum or titanium are known to have the effects to impart an affinity for a resin composition and to improve operability such as dehydration, drying or grinding in production steps, and it is preferred to coat at least the hydrated oxide of aluminum as the second layer (the outer layer) on the titanium dioxide pigment.

As the organic compounds which can be used for surface coating of the titanium dioxide pigment of the present invention, mention may be made of, for example, polyhydric alcohols, alkanolamines or derivatives thereof, organosilicon compounds, higher fatty acids or metal salts thereof, etc. Examples thereof are trimethylolethane, tripropanolethane, pentaerythritol, etc. as the polyhydric alcohols; triethylamine, etc. as the alkanolamines; polysiloxanes such as dimethylpolysiloxane and methylhydrogenpolysiloxane, alkylsilanes such as hexyltrimethoxysilane, and organosilanes, e.g., silane coupling agents such as aminosilane, vinylsilane and phenylsilane as the organosilicon compounds; stearic acid, etc. as the higher fatty acids; and magnesium stearate, zinc stearate, etc. as the metal salts of higher fatty acids. The kind, combination and coating order of these organic compounds can also be selected depending on the purpose. Total coating amount of the organic compounds is preferably 0.01-5% by weight, more preferably 0.05-2% by weight.

A specific example of the composition of surface coating is a coating comprising a hydrated oxide of aluminum in an amount of 1-5% by weight, preferably 1-4% by weight calculated as $Al_2O_3$. This compound is superior in dispersibility and is suitable for paints which require high gloss. Since anatase type titanium dioxide is high in photocatalytic activity, titanium dioxide pigment which has the coating layer of the above hydrated oxide of aluminum as the second layer (the outer layer) and a dense coating layer of a hydrated oxide of silicon in an amount of 1-10% by weight, preferably 1-5% by weight calculated as $SiO_2$ as the first layer of the outermost shell (coated on the surface of the titanium dioxide pigment) is suitable for paints which require weathering resistance. Furthermore, a hydrated oxide of zirconium in an amount of 0.05-5% by weight, preferably 0.05-2% by weight calculated as $ZrO_2$ may be coated in place of the hydrated oxide of silicon, and moreover a hydrated oxide of tin in an amount of 0.05-5% by weight, preferably 0.05-2% by weight calculated as $SnO_2$ may be laminated on the coating layer of hydrated oxide of zirconium. When a polyhydric alcohol, preferably trimethylolethane or trimethylolpropane is coated in an amount of 0.1-2% by weight, preferably 0.1-1% by weight on the titanium dioxide pigment coated with the inorganic compound, the affinity for the resin component of paints is further enhanced, which is preferred.

Another example is a titanium dioxide pigment which is coated with a hydrated oxide of silicon in an amount of 2-10% by weight, preferably 2-6% by weight calculated as $SiO_2$ as the first layer (the inner layer) and a hydrated oxide of aluminum in an amount of 1-10% by weight, preferably 1-5% by weight calculated as $Al_2O_3$ as the second layer (the outer layer). This titanium dioxide pigment is high in opacity and excellent in printability, particularly, for reverse printing gravure ink or flexographic ink. It can be selected within the above-mentioned range of coating amount whether the coating layer of the hydrated oxide of silicon should be a dense layer, a porous layer or a laminate layer of dense layer and porous layer. For flexographic ink, especially preferred is the titanium dioxide pigment coated with the hydrated oxides of silicon and aluminum in the above ranges wherein the total coating amount is in the range of 5-15% by weight. Alternatively, a titanium dioxide pigment coated with no hydrated oxide of silicon and coated with only the hydrated oxide of aluminum in an amount of 5-15% by weight, preferably 5-10% by weight calculated as $Al_2O_3$ can also be used for flexographic inks. When a hydrated oxide of titanium in an amount of 0.1-5% by weight, preferably 0.1-2% by weight calculated as $TiO_2$ is coated in place of the silicon compound as the first layer (the inner layer), the titanium dioxide pigment becomes high in gloss and is suitable for surface printing gravure inks. When a polyhydric alcohol, preferably trimethylolethane or trimethylolpropane is coated in an amount of 0.1-2% by weight, preferably 0.1-1% by weight on the titanium dioxide pigment coated as mentioned above, the affinity for the resin component of inks is enhanced, which is preferred.

Further another example is a titanium dioxide pigment which is coated with a hydrated oxide of aluminum in an amount of 0.05-3% by weight, preferably 0.1-2% by weight calculated as $Al_2O_3$. When this is used as a titanium dioxide pigment for plastics, the photocatalytic activity is reduced to some extent and content of water originating from the hydrated oxide of aluminum is low, and, therefore, this is suitable for processing at high temperatures. Alternatively, when an aluminum phosphate hydrate in an amount of 0.1-5% by weight, preferably 0.5-3% by weight calculated as $AlPO_4$ is coated in place of the aluminum-compound, the titanium dioxide pigment is further improved in light resistance. When an organic compound is further coated in an amount of 0.1-2% by weight, preferably 0.1-1% by weight on the titanium dioxide pigment coated with the above inorganic compound, the affinity for the resin component is enhanced, which is more preferred. Preferred organic compounds are polyhydric alcohols such as trimethylolethane and trimethylolpropane, organosilicon compounds such as polysiloxanes, alkylsilanes and aminosilanes, and higher fatty acids such as stearic acid. Since organosilicon compounds and higher fatty acids render the surface of titanium dioxide hydrophobic, not only a high affinity for the resin component is obtained, but also water absorption is considerably inhibited. Moreover, they have an effect to inhibit discoloration of phenolic antioxidants such as BHT added to plastics.

Next, the present invention relates to a method for producing an anatase type titanium dioxide pigment by calcination of a hydrous titanium oxide with heating in the presence of a calcination treating agent, which comprises calcining the hydrous titanium oxide by heating it at a temperature of not lower than 800° C. and lower than 1000° C., using as the calcination treating agents an aluminum compound corresponding to 0.02-0.2% by weight calculated as $Al_2O_3$, a potassium compound corresponding to 0.2-1% by weight calculated as $K_2O$ and a phosphoric acid compound corresponding to 0.02-0.5% by weight calculated as $P_2O_5$ based on the weight of $TiO_2$ in the hydrous titanium oxide, the ratio $K_2O/P_2O_5$ being in the range of 1.5/1-10/1. It is considered that the potassium compound and the phosphoric acid compound act synergistically to provide an effect to regulate the shape of the particles produced, and the aluminum compound has an action to inhibit occurrence of the phenomenon that titanium dioxide is reduced during calcination by heating to cause deterioration of whiteness. Therefore, in order to increase the particle diameter by firing at high temperatures, there are needed the potassium compound, the phosphoric acid compound and the aluminum compound in the amounts of the above ranges. On the other hand, if the amount of the phosphoric acid compound is too large, it is supposed that the compound hinders the growth of particles, and in order to obtain large particles, calcination at the higher temperature is needed, but since anatase type crystals have the property of being readily converted to rutile type at high temperatures, production of rutile type cannot be inhibited. However, it is considered that in the present invention the ratio of the potassium compound and the phosphoric acid compound added is specified in the above range, and, as a result, the particles can be grown even at a temperature lower than 1000° C., and the desired titanium dioxide pigment which has substantially anatase type crystal and is large in particle diameter and excellent in whiteness can be obtained.

Preferred ranges of the amount of the aluminum compound, the potassium compound and the phosphoric acid compound are 0.05-0.2% by weight (0.2 is not inclusive), 0.2-0.5% by weight and 0.02-0.2% by weight (0.2 is not inclusive), respectively, and preferred range of the ratio of the potassium compound and the phosphoric acid compound is 2/1-10/1. In the present invention, aluminum oxide, aluminum chloride, etc. can be used as the aluminum compound, potassium hydroxide, potassium chloride, etc. can be used as the potassium compound, and orthophosphoric acid, metaphosphoric acid, pyrophosphoric acid and salts thereof, etc. can be used as the phosphoric acid compound. The method of adding these calcination treating agents is not limited, and, for example, there is a method of dispersing the hydrous titanium oxide in a dispersion medium such as water and then adding the calcination treating agents to the dispersion, followed by mixing.

A hydrous titanium oxide is calcined by heating in the presence of the above calcination treating agents to obtain an anatase type titanium dioxide pigment having an average particle diameter of 0.2-0.4 µm. The hydrous titanium oxide used in the present invention has an anatase type structure and can be obtained by a method for the production of titanium dioxide pigment, which is called sulfuric acid process. For example, a titanium-containing ore such as ilmenite ore or titanium slug which is ground, if necessary, is dissolved in sulfuric acid, thereby reacting the titanium component with sulfuric acid to produce titanyl sulfate ($TiOSO_4$), which is classified by allowing to stand, filtered and then hydrolyzed with heating to obtain the desired hydrous titanium oxide. Alternatively, there may be applied a method of hydrolyzing the titanyl sulfate in the presence of a previously prepared nucleus crystal. The nucleus crystal is obtained, for example, by aging hydrous titanium oxide. The particle diameter of the hydrous titanium oxide used is preferably 0.001-0.01 µm. Furthermore, the amount of sulfate group contained in the hydrous titanium oxide is desirably at most 0.1% by weight calculated as $SO_4$. If the sulfate group is contained in an amount of more than 0.1% by weight, the anatase type titanium dioxide obtained by calcination decreases in whiteness and cannot be used as pigment. The calcination temperature is more preferably 800-980° C. For calcination by heating, there may be used known apparatuses such as rotary kiln and tunnel kiln.

After titanium dioxide particles of desired particle diameter are obtained, they may be subjected to wet grinding, dehydration, washing, drying and dry grinding by known methods. Moreover, between the respective steps, coating treatment with inorganic compound or organic compound can be optionally carried out. A vertical sand mill, a horizontal sand mill, etc. can be used for the wet grinding; a band type heater, a batch type heater, etc. can be used for the drying; and shock grinding machines such as a hammer mill and a pin mill, attrition grinding machines such as a disintegration grinding machine, flash grinding machines such as a jet mill and snail mill, and a spray drying machine can be used for dry grinding.

The coating with inorganic compound can be carried out in the following manner. That is, the titanium dioxide particles are dispersed in a liquid medium such as water to prepare a slurry. After the slurry is preferably subjected to further wet grinding, a solution of a salt of the desired inorganic compound is added thereto, followed by adding an acidic compound or a basic compound, or a salt of the inorganic compound and an acidic compound or a basic compound are simultaneously added to carry out a neutralization reaction, thereby depositing the inorganic compound on the surface of the titanium dioxide particles. The salts of inorganic compounds which can be used in the present invention include, for example, sodium aluminate, aluminum sulfate and aluminum nitrate as salts of aluminum compound, sodium silicate and potassium silicate as salts of silicon compound, zirconium chloride as salts of zirconium compound, tin chloride as salts of tin compound, and titanium chloride and titanium sulfate as salts of titanium compound. The acidic compounds include, for example, inorganic acids such as sulfuric acid and hydrochloric acid, and organic acids such as acetic acid. The basic compounds include, for example, hydroxides or carbonates of alkali metals or alkaline earth metals such as sodium hydroxide, potassium hydroxide and sodium carbonate, ammonium compounds such as ammonia, and amines.

When the titanium dioxide particles is coated with an organic compound which does not bond to the surface of the titanium dioxide particles or is weak in bonding force, such as a polyhydric alcohol, an alkanolamine or a derivative thereof, a polysiloxne, or a higher fatty acid or a derivative thereof, the coating is preferably carried out by dry grinding the titanium dioxide particles and then mixing the titanium dioxide particles with the organic compound by a high-speed stirrer such as Henschel mixer or super mixer or by employing so-called dry treatment which comprises charging the titanium dioxide particles and the organic compound in a dry grinding machine to simultaneously carry out grinding, mixing and coating. The method of simultaneously carrying out grinding and coating by a flash grinding machine is industrially preferred because the organic compound is apt to be uniformly coated and, further, the treating performance is high. In the case of coating an organic compound such as an organosilane which reacts with the surface of the titanium dioxide particles to firmly bond to the surface, there can be employed so-called wet treatment which comprises adding the organic compound to a titanium dioxide slurry after wet grinding or after coating with inorganic compound. Moreover, there may be employed a method which comprises subjecting the higher fatty acid salt such as sodium stearate to neutralization treatment in the titanium dioxide slurry to form a coating layer of the higher fatty acid.

Further, the present invention provides a resin composition comprising the above titanium dioxide pigment and a resin component. Since the resin composition of the present invention contains the titanium dioxide pigment, it has high opacity in addition to the optical characteristics and physical characteristics possessed by the conventional anatase type titanium oxides. Moreover, according to the present invention, the titanium dioxide pigment can be contained in a high concentration, and hence resin compositions useful for various uses such as paints, papers and fibers can be obtained by selecting the kind of the resin component. Particularly, the titanium dioxide pigment is useful for paint compositions, ink compositions, and plastics compositions. The specific pigment concentration which varies depending on the use is preferably 0.5-10 parts by weight of the titanium dioxide pigment based on 1 part by weight of the resin component in the case of paint compositions or ink compositions, and 0.05-2 parts by weight based on 1 part by weight of the resin component in the case of plastics compositions. In the present invention, solvents, additives, fillers, etc. may be contained in addition to the titanium dioxide pigment and the resin component.

The resin composition of the present invention which contains a paint resin is not only high in opacity, but also is not needed to be subjected to toning with a color pigment and dye, a fluorescent brightening agent, etc. due to the characteristics of anatase type, namely, high reflectance for light of short wavelength, whereby vivid white color tone is obtained in the field which requires bluish color tone. When an ultraviolet-curing resin is used as the paint resin, the anatase type titanium dioxide can hardly absorb ultraviolet rays having a wavelength near the visible light, and hence the curing is not hindered as is caused in the rutile type titanium dioxide. The resin composition of the present invention which contains a paint resin can be used for painting of various base materials such as metals, woods, plastics, and concrete, and is particularly suitable for coating of indoor members. The painting methods include various known methods such as brushing, roller coating, spray coating, dip coating, electrostatic coating, etc.

When a titanium dioxide pigment coated with a hydrated oxide of aluminum in an amount of 1-5% by weight, preferably 1-4% by weight calculated as $Al_2O_3$ is used as the titanium dioxide pigment contained in the resin composition of the present invention containing a paint resin as a resin component, the resulting resin composition provides a coating film excellent in gloss. Moreover, when the above coating layer of the hydrated oxide of aluminum is provided as the second layer (the outer layer), and a dense layer of a hydrated oxide of silicon in an amount of 1-10% by weight, preferably 1-5% by weight calculated as $SiO_2$ is provided as the first layer (the inner layer) (present in contact with the surface of the titanium dioxide pigment), the resulting resin composition gives a coating film excellent in weathering resistance. Furthermore, a hydrated oxide of zirconium in an amount of 0.05-5% by weight, preferably 0.05-2% by weight calculated as $ZrO_2$ may be coated in place of the hydrated oxide of silicon, and furthermore a hydrated oxide of tin in an amount of 0.05-5% by weight, preferably 0.05-2% by weight calculated as $SnO_2$ may be laminated on the coating layer of the hydrated oxide of zirconium. Moreover, when a polyhydric alcohol, preferably trimethylolethane or trimethylolpropane is further coated in an amount of 0.1-2% by weight, preferably 0.1-1% by weight, the affinity for the resin component is enhanced, and not only the productivity of paint is improved, but also a coating film higher in gloss can be provided.

The paint resin components include, for example, alkyd resins, acrylic resins, polyester resins, epoxy resins, amino resins, fluorine-containing resins, modified silicone resins, urethane resins, vinyl resins, etc. and they can be optionally selected. These paint resin components are of organic solvent-dissolving type, water-soluble type, emulsion type, etc., and are not particularly limited. Curing methods are also not limited, and can be heat-curing type, cold-curing type, ultraviolet-curing type, electron ray-curing type, etc. The resin composition of the present invention containing the paint resin may contain organic solvents such as alcohols, esters, ethers, ketones, aromatic hydrocarbons, and aliphatic hydrocarbons, water or mixed solvents thereof as solvents, and the solvents are selected depending on suitability for the resin components. In addition, there may be contained various additives, e.g., coloring agents such as organic pigments, inorganic pigments and dyes, extenders, surface active agents, plasticizers, curing aids, dryers, anti-foaming agents, thickening agents, emulsifiers, flow adjusters, anti-skinning agents, anti-segregating agents, ultraviolet absorbers, and mildew-proofing agents, and fillers, etc. depending on the purpose. Furthermore, the resin composition may be in the form of a two-pack paint used by adding to the paint the curing agent, the curing aid and the curing resin component as a separate curing solution at the time of painting. It is preferred to further add a photopolymerization initiator, a light sensitizing agent, etc. to the resin composition containing the ultraviolet curing type resin.

When a paint resin is used as the resin component, the resin composition of the present invention is obtained by adding, if necessary, various solvents to the titanium dioxide pigment and the paint resin component, followed by dispersing them using a dispersing machine such as sand mill, disper, ball mill, paint shaker, twin-roll mill, or triple roll mill. The above additives and fillers can be added to the paint during dispersing or after dispersing.

In case the resin composition of the present invention containing an ink resin is used especially for gravure printing inks such as reverse printing inks and surface printing inks, abrasion of doctor blade is inhibited, printing defects such as fogging of plate and doctor lines hardly occur due to the characteristics of anatase type, namely, lower hardness, and the opacity is excellent due to the characteristic of anatase type titanium dioxide, namely, lower hardness. Moreover, recently, there are demanded speeding-up of printing and switching to water-soluble inks, non-toluene type inks and ultraviolet-curing type inks which are less in environmental pollution, and in these technologies, increase of drying speed is important. At present, as one solution, investigation on reduction of coating film thickness is being conducted, but if the film thickness is reduced, opacity equal to that of the conventional technologies cannot be obtained, and if the pigment concentration is increased to enhance the opacity, the doctor blade is apt to be abraded. In the present invention, since the abrasion of the doctor blade is inhibited as mentioned above, it is easy to increase the pigment concentration. Furthermore, the printing method using doctor blade also spreads in flexographic printing, and in this field, deterioration of productivity owing to changing of abraded doctor blades causes problems, while when the present invention is employed, the intervals for exchanging of doctor blades can be prolonged. The resin composition of the present invention containing an ink resin is useful for various printing inks used for intaglio printing, letterpress printing, lithographic printing and stencil printing other than the above-mentioned gravure printing and flexographic printing, and the substrates to be printed are not limited and include plastics, films, papers, metal foils, etc. Further, the present invention is applied to not only the final printing inks, but also to intermediate articles such as toning inks and color chips.

When a titanium dioxide pigment having a coating layer of a hydrated oxide of silicon in an amount of 2-10% by weight, preferably 2-5% by weight calculated as $SiO_2$ as the first layer (the inner layer) and a coating layer of a hydrated oxide of aluminum in an amount of 1-10% by weight, preferably 1-6% by weight calculated as $Al_2O_3$ as the second layer (the outer layer) is used as the titanium dioxide pigment contained in the resin composition of the present invention containing an ink resin as a resin component, the resulting resin composition is high in opacity, excellent in printability and suitable for reverse gravure printing or flexographic printing. As the coating layer of hydrated oxide of silicon, there may be optionally selected a dense layer, a porous layer, a laminate layer comprising the dense layer and the porous layer. It is especially preferred to use a titanium dioxide pigment coated with a hydrated oxide of silicon and a hydrated oxide of aluminum in a total coating amount of 5-15% by weight for flexographic inks. Furthermore, a titanium dioxide pigment coated with no hydrated oxide of silicon and coated with only a hydrated oxide of aluminum in an amount of 5-15% by weight, preferably 5-10% by weight calculated as $Al_2O_3$ can also be used for flexographic printing inks. When a titanium dioxide pigment coated with a hydrated oxide of titanium in an amount of 0.1-5% by weight, preferably 0.1-2% by weight calculated as $TiO_2$ in place of the silicon compound as the first layer (the inner layer) is used, the resin composition is high in gloss and suitable for surface gravure printing. When a titanium dioxide pigment further coated with a polyhydric alcohol, preferably trimethylolethane or trimethylolpropane in an amount of 0.1-2% by weight, preferably 0.1-1% by weight is used, the affinity between the pigment and the resin component is high and the resin composition can form an ink coating film excellent in surface smoothness and gloss.

The ink resin components used can be optionally selected depending on printing method, kind of the substrate to be printed, and include, for example, urethane resins, chlorinated vinyl acetate resins, chlorinated polypropylene resins, polyamide resins, acrylic resins, maleic acid resins, cyclized rubber resins, pyroxylin, rosin, etc. These ink resin components are of organic solvent-dissolving type, water-soluble type, emulsion type, etc., and are not particularly limited. Curing methods are also not limited, and can be heat-curing type, cold-curing type, ultraviolet-curing type, electron ray-curing type, etc. The resin composition of the present invention containing the ink resin may contain organic solvents such as alcohols, esters, ethers, ketones, aromatic hydrocarbons, and aliphatic hydrocarbons, water or mixed solvents thereof as solvents, and the solvents are selected depending on suitability for the resin components. In addition, there may be contained various additives, e.g., coloring agents such as organic pigments, inorganic pigments and dyes, extenders, surface active agents, antistatic agents, plasticizers, curing aids, anti-foaming agents, lubricants, antioxidants, ultraviolet absorbers, chelating agents, etc. and fillers depending on the uses.

When an ink resin is used as the resin component, the resin composition of the present invention is obtained by adding, if necessary, various solvents to the titanium dioxide pigment and the ink resin component, followed by dispersing them using a dispersing machine such as sand mill, attritor, disper, ball mill, paint shaker, twin-roll mill, or triple roll mill. Alternatively, the pigment and the resin component can be kneaded and made to chips. The above additives and fillers can be added to the ink during dispersing or after dispersing.

In case the resin composition of the present invention containing a plastic resin is used especially for laminated articles such as water resistant papers, a peculiar bluish color tone can be imparted due to the characteristics of anatase type titanium dioxide, namely, high reflectance for light of short wavelength, and in addition, superior opacity can be imparted. Therefore, the pigment concentration can be lowered and compositions having substantially no surface defects such as lacing and pin holes can be obtained. Furthermore, the resin composition of the present invention containing a plastic resin is also useful for the uses such as injection molded products, extrusion molded products, inflation products and calendered products, and the use is not limited to laminated products. Moreover, the present invention can be applied not only to final molded products, but also to intermediate products such as color pellets and master batches (color concentrations).

When a titanium dioxide pigment coated with a hydrated oxide of aluminum in an amount of 0.05-2% by weight, preferably 0.1-1.5% by weight calculated as $Al_2O_3$ is used as the titanium dioxide pigment contained in the resin composition of the present invention containing a plastic resin as a resin component, the resulting resin composition is excellent in light resistance and less in content of water originating from the inorganic compound, and hence the composition is suitable for being processed at high temperatures. Moreover, when a titanium dioxide pigment coated with an aluminum phosphate hydrate in an amount of 0.1-2% by weight, preferably 0.5-2% by weight calculated as $AlPO_4$ in place of the aluminum compound is used, the composition is higher in light resistance. Furthermore, when a titanium dioxide pigment further coated with at least one compound selected from a polyhydric alcohol, preferably trimethylolethane or trimethylolpropane, an organosilicon compound, preferably a polysiloxane or an organosilane, a higher fatty acid preferably stearic acid in an amount of 0.1-2% by weight, preferably 0.1-1% by weight is used, the affinity for the resin component is enhanced, and there is obtained a composition excellent in surface appearance with occurrence of substantially no unsatisfactory dispersion of the particles of titanium dioxide pigment. When a titanium dioxide pigment coated with at least an organosilicon compound or a higher fatty acid is used, since the surface of the titanium dioxide becomes hydrophobic, the water absorption is considerably inhibited, and discoloration of phenolic antioxidants such as BHT added to the plastics is also inhibited, and thus more preferred composition is obtained.

The plastic resin component can be optionally selected depending on processing method, etc. and there may be used, for example, thermosetting resins such as polyolefin resins, vinyl chloride resins, vinyl acetate resins, polystyrene resins, ABS resins, polyester resins, aromatic resins, nylon resins, polycarbonate resins, cellulose resins, and polylactate resins and thermoplastic resins such as phenolic resins, urethane resins and unsaturated polyester resins, and the plastic resin component is not limited. In addition to the titanium dioxide pigment and the plastic resin component, the resin composition of the present invention containing a plastic resin may further contain various additives, e.g., coloring agents such as organic pigments, inorganic pigments and dyes, extenders, surface active agents, plasticizers, lubricants, stabilizers, antistatic agents, antioxidants, ultraviolet absorbers, light stabilizers, flame retardants, brightening agents, bactericides, and reinforcing materials, and fillers depending on the purpose.

In the case of using a plastic resin as the resin component, the resin composition of the present invention is obtained by adding, if necessary, the above additives or fillers to the titanium dioxide pigment and the plastic resin component, and dispersing them by known methods using an extrusion molding machine such as single-screw or twin screw extruder, a roll molding machine such as calender roll, or a pressure mixer such as Banbury mixer. Alternatively, the mixture may be pelletized using an extrusion molding machine or a pressure mixer, followed by molding by an injection molding machine or various molding machines mentioned above.

EXAMPLES

Examples of the present invention will be given below. These examples should not be construed as limiting the invention in any manner.

1. Examples Relating to Titanium Dioxide Pigments and Methods for the Production of Them Example 1

(1) Preparation of Titanium Dioxide Particles

To hydrous titanium oxide (having a particle diameter of 0.005 μm) were added aluminum sulfate corresponding to 0.1% by weight calculated as $Al_2O_3$, potassium hydroxide corresponding to 0.3% by weight calculated as $K_2O$ and orthophosphoric acid corresponding to 0.15% by weight calculated as $P_2O_5$ based on the weight of $TiO_2$ in the hydrous titanium oxide as calcination treating agents, and these were calcined by heating at 960° C. for 1 hour using an electric oven to obtain anatase type titanium dioxide particles. An aqueous slurry of the resulting titanium dioxide particles having a $TiO_2$ concentration of 300 g/liter was prepared, and an aqueous sodium hydroxide solution was added thereto to adjust the pH to 10.5 and the particles were dispersed, followed by carrying out grinding with a sand mill and classification with allowing to stand.

(2) Surface Treatment 1000 ml of the slurry after subjected to classification was taken, and sulfuric acid was added to the slurry with stirring and with keeping the temperature at 60° C. to adjust the pH to 9. Then, 40 ml of an aqueous sodium aluminate solution (150 g/liter as $Al_2O_3$) and sulfuric acid were added to the slurry over a period of 20 minutes so as to keep the pH at 8-9. Then, pH of the slurry was adjusted to 7 with sulfuric acid, followed by aging for 30 minutes. After the aging, the slurry was filtered by a suction filter, washed with water, dried at 120° C. for 20 hours, and ground by a jet mill to obtain a titanium dioxide pigment of the present invention which had an average particle diameter of 0.25 μm and was coated with an aluminum oxide hydrate in an amount of 2% by weight calculated as $Al_2O_3$ (Sample A). The sulfate group contained in the Sample A was in an amount of 0.03% by weight calculated as $SO_4$.

Example 2

A titanium dioxide pigment of the present invention (Sample B) was obtained in the same manner as in Example 1, except that the coating amount of the aluminum oxide hydrate was 0.5% by weight calculated as $Al_2O_3$.

Example 3

A titanium dioxide pigment of the present invention having an average particle diameter of 0.3 μm (Sample C) was obtained in the same manner as in Example 1, except that the amount of potassium hydroxide was 0.32% by weight calculated as $K_2O$ and the amount of orthophosphoric acid was 0.08% by weight calculated as $P_2O_5$ based on the weight of $TiO_2$ in the hydrous titanium oxide and the calcination was carried out by heating at 930° C. for 1 hour.

Example 4

A titanium dioxide pigment of the present invention having an average particle diameter of 0.3 μm (Sample D) was obtained in the same manner as in Example 1, except that the amount of potassium hydroxide was 0.36% by weight calculated as $K_2O$ and the amount of orthophosphoric acid was 0.04% by weight calculated as $P_2O_5$ based on the weight of $TiO_2$ in the hydrous titanium oxide and the calcination was carried out by heating at 920° C. for 1 hour.

Example 5

1000 ml of the slurry after subjected to classification in Example 1 was taken, and 120 ml of an aqueous sodium silicate solution (150 g/liter as $SiO_2$) was added to the slurry with stirring and with keeping the temperature at 80° C. over a period of 60 minutes and the pH was adjusted to 5 with sulfuric acid over a period of 120 minutes, followed by aging for 60 minutes. Then, pH was adjusted to 9 with an aqueous sodium hydroxide solution, and, thereafter, 60 ml of an aqueous sodium aluminate solution (150 g/liter as $Al_2O_3$) and sulfuric acid were added to the slurry over a period of 30 minutes so as to keep the pH at 8-9. Then, pH of the slurry was adjusted to 7 with sulfuric acid, followed by aging for 60 minutes. After the aging, the slurry was washed with water, dried and ground in the same manner as in Example 1 to obtain a titanium dioxide pigment of the present invention which had an average particle diameter of 0.25 μm and was coated with a silicon oxide hydrate in an amount of 6% by weight calculated as $SiO_2$ as the first layer and with an aluminum oxide hydrate in an amount of 3% by weight calculated as $Al_2O_3$ as the outermost layer (Sample E).

Example 6

1000 ml of the slurry after subjected to classification in Example 1 was taken, and sulfuric acid was added to the slurry with stirring and with keeping the temperature at 70° C. to adjust the pH to 3. Then, 60 ml of an aqueous sodium silicate solution (150 g/liter as $SiO_2$) was added to the slurry over a period of 20 minutes and the pH was adjusted to 5 with sulfuric acid over a period of 10 minutes, followed by aging for 30 minutes. Then, pH was adjusted to 9 with an aqueous sodium hydroxide solution, and, thereafter, 60 ml of an aqueous sodium aluminate solution (150 g/liter as $Al_2O_3$) and sulfuric acid were added to the slurry over a period of 30 minutes so as to keep the pH at 8-9. Then, pH of the slurry was adjusted to 7 with sulfuric acid, followed by aging for 30 minutes. After the aging, the slurry was washed with water, dried and ground in the same manner as in Example 1 to obtain a titanium dioxide pigment of the present invention which had an average particle diameter of 0.25 μm and was coated with a silicon oxide hydrate in an amount of 3% by weight calculated as $SiO_2$ as the first layer and with an aluminum oxide hydrate in an amount of 3% by weight calculated as $Al_2O_3$ as the outermost layer (Sample F).

Example 7

1000 ml of the slurry after subjected to classification in Example 1 was taken, and 80 ml of an aqueous sodium silicate solution (150 g/liter as $SiO_2$) was added to the slurry with stirring and with keeping the temperature at 60° C. over a period of 60 minutes, followed by aging for 30 minutes. Then, 80 ml of an aqueous sodium aluminate solution (150 g/liter as $Al_2O_3$) was added to the slurry over a period of 40 minutes. Then, pH of the slurry was adjusted to 7 with sulfuric acid over a period of 30 minutes, followed by aging for 60 minutes. After the aging, the slurry was washed with water, dried and ground in the same manner as in Example 1 to obtain a titanium dioxide pigment of the present invention which had an average particle diameter of 0.25 μm and was coated with a mixture of a silicon oxide hydrate in an amount of 4% by weight calculated as $SiO_2$ and an aluminum oxide hydrate in an amount of 4% by weight calculated as $Al_2O_3$ (Sample G)

Comparative Example 1

A titanium dioxide pigment as a comparative sample (Sample H) was obtained in the same manner as in Example 1, except that the amount of aluminum sulfate was 0.05% by weight, the amount of potassium hydroxide was 0.4% by weight and the amount of orthophosphoric acid was 0.4% by weight based on the weight of $TiO_2$ in the hydrous titanium oxide and the calcination was carried out by heating at 920° C. for 1 hour. The resulting titanium dioxide pigment had an average particle diameter of 0.16 μm.

Comparative Example 2

A titanium dioxide pigment as a comparative sample (Sample I) was obtained in the same manner as in Comparative Example 1, except that the calcination was carried out by heating at 980° C. for 1 hour. The resulting titanium dioxide pigment had an average particle diameter of 0.25 μm.

Comparative Example 3

A titanium dioxide pigment as a comparative sample (Sample J) was obtained in the same manner as in Example 1, except that the amount of aluminum sulfate was 0.1% by weight, the amount of potassium hydroxide was 0.4% by weight and the amount of orthophosphoric acid was 0.8% by weight based on the weight of $TiO_2$ in the hydrous titanium oxide and the calcination was carried out by heating at 1010° C. for 1 hour. The resulting titanium dioxide pigment had an average particle diameter of 0.25 μm.

Comparative Example 4

A titanium dioxide pigment as a comparative sample (Sample K) was obtained in the same manner as in Example 1, except that the amount of aluminum sulfate was 0.1% by weight, the amount of potassium hydroxide was 0.3% by weight and the amount of orthophosphoric acid was 0.45% by weight based on the weight of $TiO_2$ in the hydrous titanium oxide and the calcination was carried out by heating at 1040° C. for 1 hour. The resulting titanium dioxide pigment had an average particle diameter of 0.3 μm.

Comparative Example 5

A titanium dioxide pigment as a comparative sample (Sample L) was obtained in the same manner as in Comparative Example 1, except that the coating amount of the aluminum oxide hydrate was 0.5% by weight calculated as $Al_2O_3$.

Comparative Example 6

A titanium dioxide pigment as a comparative sample (Sample M) was obtained in the same manner as in Example 5, except for using the anatase type titanium dioxide particles obtained in Comparative Example 1 and having an average particle diameter of 0.16 μm.

Comparative Example 7

A titanium dioxide pigment as a comparative sample (Sample N) was obtained using rutile type titanium dioxide particles having an average particle diameter of 0.25 μm and carrying out the surface treatment in the same manner as in Example 1.

Comparative Example 8

A titanium dioxide pigment as a comparative sample (Sample O) was obtained using the rutile type titanium dioxide particles used in Comparative Example 7 and carrying out the surface treatment in the same manner as in Example 6.

Evaluation 1: Evaluation of Whiteness (Linseed Oil Color)

Whiteness of the samples (A-O) obtained in Examples 1-7 and Comparative Examples 1-8 was evaluated in accordance with the method of JIS K5116. First, 2.0 g of the sample and 1.25 ml of linseed oil were lightly mixed by a spatula on a glass plate and then kneaded a hand muller by revolution of 50 times to prepare a paste. The paste was coated on a glass plate using a film applicator of 10 mils. Value L of the coated paste in accordance with the Hunter color indication system was measured by a color difference meter (Z-1001DP manufactured by Nippon Denshoku Kogyo Co., Ltd.). The results are shown in Table 1. The samples higher in the L value are superior in whiteness.

Evaluation 2: Measurement of Content of Anatase Type Crystal

Each of the samples (A-O) obtained in Examples 1-7 and Comparative Examples 1-8 was packed in an aluminum cell so as to give a smooth surface, and then content of rutile type crystal (R(%)) was obtained using an X-ray diffractometer (RAD-2VC manufactured by Rigaku Co., Ltd.). The content of anatase type (type A) was 100–R (%). The results are shown in Table 1.

Evaluation 3: Evaluation of Particle Size Distribution

Particle size distribution of the particles of 0.2-0.4 μm in particle diameter was measured on the samples (A-O) obtained in Examples 1-7 and Comparative Examples 1-8 from electron photomicrographs using a particle analyzer (TGZ3 manufactured by Carl Zeiss Co., Ltd.). The particle size distribution was based on weight. The results are shown in Table 1.

TABLE 1

| | Sample | Calcination treating agent (%) | | | | Surface treatment | | Calcination temperature (° C.) | Average particle diameter (μm) | Linseed oil color (L value) | Content of type A (%) | Particle size distribution (%) |
| | | $Al_2O_3$ | $K_2O$ | $P_2O_5$ | $K_2O/P_2O_5$ | $SiO_2$ (%) | $Al_2O_3$ (%) | | | | | |
|---|---|---|---|---|---|---|---|---|---|---|---|---|
| Example 1 | A | 0.1 | 0.3 | 0.15 | 2/1 | 0 | 2 | 960 | 0.25 | 96.0 | 99.6 | 70 |
| Example 2 | B | 0.1 | 0.3 | 0.15 | 2/1 | 0 | 0.5 | 960 | 0.25 | 96.0 | 99.6 | 70 |
| Example 3 | C | 0.1 | 0.32 | 0.08 | 4/1 | 0 | 2 | 930 | 0.3 | 96.0 | 98.3 | 70 |
| Example 4 | D | 0.1 | 0.36 | 0.04 | 9/1 | 0 | 2 | 920 | 0.3 | 96.0 | 98.4 | 70 |
| Example 5 | E | 0.1 | 0.3 | 0.15 | 2/1 | 6 | 3 | 960 | 0.25 | 96.0 | 99.6 | 70 |
| Example 6 | F | 0.1 | 0.3 | 0.15 | 2/1 | 3 | 3 | 960 | 0.25 | 96.0 | 99.6 | 70 |
| Example 7 | G | 0.1 | 0.3 | 0.15 | 2/1 | 4 | 4 | 960 | 0.25 | 96.0 | 99.6 | 70 |
| Comparative Example 1 | H | 0.05 | 0.4 | 0.4 | 1/1 | 0 | 2 | 920 | 0.16 | 96.0 | 99.7 | 10 |
| Comparative Example 2 | I | 0.05 | 0.4 | 0.4 | 1/1 | 0 | 2 | 980 | 0.25 | 94.5 | 99.4 | 56 |
| Comparative Example 3 | J | 0.1 | 0.4 | 0.8 | 0.5/1 | 0 | 2 | 1010 | 0.25 | 94.5 | 99.7 | 56 |
| Comparative Example 4 | K | 0.1 | 0.3 | 0.45 | 0.67/1 | 0 | 2 | 1040 | 0.3 | 94.9 | 96.0 | 56 |
| Comparative Example 5 | L | 0.05 | 0.4 | 0.4 | 1/1 | 0 | 0.5 | 920 | 0.16 | 96.0 | 99.7 | 10 |
| Comparative Example 6 | M | 0.05 | 0.4 | 0.4 | 1/1 | 6 | 3 | 920 | 0.16 | 96.0 | 99.7 | 10 |
| Comparative Example 7 | N | — | — | — | — | 0 | 2 | — | 0.25 | 96.0 | 0 | 81 |
| Comparative Example 8 | O | — | — | — | — | 3 | 3 | — | 0.25 | 96.0 | 0 | 81 |

2. Examples Relating to Resin Compositions Containing a Paint Resin

Examples 8-11 and Comparative Examples 9-14

Each of the samples (A-D, H-L and N) obtained in Examples 1-4 and Comparative Examples 1-5 and 7 was charged in a glass vessel of 130 cc in volume according to the following formulation 1, followed by dispersing for 20 minutes using a paint conditioner (manufactured by Red Devil Co., Ltd.) to prepare a dispersion. Then, according to the following formulation 2, there was obtained a resin composition (paint) comprising 1 part by weight of the titanium dioxide pigment based on 1 part by weight of the resin component and having a solid volume concentration of 46%. The respective resin compositions were referred to as samples of Examples 8-11 and Comparative Examples 9-14 (Samples a-j).

TABLE 2

| Formulation 1 | Amount (g) |
| --- | --- |
| Sample | 56.0 |
| Short-oil alkyd resin: BECKOSOL J-524IM (manufactured by Dainippon Ink & Chemicals Inc.: Solid content 60 wt %) | 12.8 |
| Xylene | 10.24 |
| n-Butanol | 2.56 |
| glass beads | 60 |

TABLE 3

| Formulation 2 | Amount (g) |
| --- | --- |
| Dispersion of Formulation 1 | 81.6 |
| Short-oil alkyd resin: BECKOSOL J-524IM (manufactured by Dainippon Ink & Chemicals Inc.: Solid content 60 wt %) | 52.5 |
| Butylated melamine resin: SUPER BECKAMINE J-820 (manufactured by Dainippon Ink & Chemicals Inc.: Solid content 60 wt %) | 28.0 |
| Xylene | 16.88 |
| n-Butanol | 4.22 |

Evaluation 4: Evaluation of Opacity, Whiteness and Color Tone

Each of the resin compositions (paint) (Samples a-j) of Examples 8-11 and Comparative Examples 9-14 was coated on a black and white chart paper using a #30 bar coater, and besides coated on a white chart paper using a #60 bar coater, and were baked at 110° C. for 40 minutes to form coating films. Reflectance of the coating film on the black portion and white portion on the black and white chart paper ($Y_B$ value) and ($Y_W$ value), respectively and L value and b value of the coating film coated on the white chart paper in terms of Hunter color indication system were measured using a color computer (SM-7 manufactured by Suga Test Instruments Co., Ltd.). The opacity ($C_R$ value) was calculated in accordance with the following formula 1. The results are shown in Table 4. The resin composition greater in the $C_R$ value was superior in opacity, the resin composition greater in the L value was higher in whiteness, and the resin composition smaller in the b value was more bluish. The titanium dioxide pigments of the present invention had nearly the same opacity and whiteness as those of conventional rutile type titanium dioxide pigments, and had bluish color tone peculiar to the anatase type.

$$\text{Opacity } (C_R) = (Y_B/Y_W) \times 100 (\%) \quad \text{Formula 1:}$$

TABLE 4

| | Sample | Titanium dioxide pigment | Opacity ($C_R$) | Whiteness (L Value) | Color tone (b Value) |
| --- | --- | --- | --- | --- | --- |
| Example 8 | a | Sample A | 89 | 94 | −0.7 |
| Example 9 | b | Sample B | 89 | 94 | −0.7 |
| Example 10 | c | Sample C | 89 | 94 | −0.7 |
| Example 11 | d | Sample D | 89 | 94 | −0.7 |
| Comparative Example 9 | e | Sample H | 83 | 94 | −0.9 |
| Comparative Example 10 | f | Sample I | 87 | 93 | −0.5 |
| Comparative Example 11 | g | Sample J | 87 | 92 | −0.2 |
| Comparative Example 12 | h | Sample K | 87 | 92 | −0.1 |
| Comparative Example 13 | i | Sample L | 83 | 94 | −0.9 |
| Comparative Example 14 | j | Sample N | 90 | 94 | −0.2 |

3-1 Examples Relating to Resin Compositions Containing Ink Resin (Solvent Type Gravure Inks)

Examples 12-15 and Comparative Examples 15-18

Each of the titanium dioxide pigments (Samples A, E-G) of Examples 1, 5-7 was charged in a glass vessel of 130 cc in volume according to the following formulation 3, followed by dispersing for 30 minutes using a paint conditioner (manufactured by Red Devil Co., Ltd.) to prepare a dispersion. Then, according to the following formulation 4, there was obtained a resin composition (gravure ink composition) of the present invention comprising 4 parts by weight of the titanium dioxide pigment based on 1 part by weight of the resin component and having a solid volume concentration of 37.5%. These resin compositions were referred to as samples of Examples 12-15 (Samples k-n). Moreover, gravure ink compositions were similarly prepared using the titanium dioxide pigments (Samples H, M-O) of Comparative Examples 1, 6-8. These compositions were referred to as samples of Comparative Examples 15-18 (Samples o-r).

TABLE 5

| Formulation 3 | Amount (g) |
| --- | --- |
| Sample | 50.0 |
| Urethane resin IB-422 | 50.0 |
| (manufactured by Sanyo Kasei Co., Ltd.: Solid content 15 wt %) | |
| Glass beads | 100 |

TABLE 6

| Formulation 4 | Amount (g) |
| --- | --- |
| Dispersion of Formulation 3 | 100.0 |
| Urethane resin IB-422 (manufactured by Sanyo Kasei Co., Ltd.: Solid content 15 wt %) | 33.3 |

3-2 Examples Relating to Resin Compositions Containing Ink Resin (Aqueous Flexographic Inks)

Examples 16-19 and Comparative Examples 19-22

Each of the titanium dioxide pigments (Samples A, E-G) of Examples 1, 5-7 was charged in a glass vessel of 130 cc in volume according to the following formulation 5, followed by dispersing for 30 minutes using a paint conditioner (manufactured by Red Devil Co., Ltd.) to prepare a dispersion. Then, according to the following formulation 6, there was obtained a resin composition (aqueous flexographic ink composition) of the present invention comprising 6.3 parts by weight of the titanium dioxide pigment based on 1 part by weight of the resin component and having a solid volume concentration of 54.5%. These resin compositions were referred to as samples of Examples 16-19 (Samples s-v). Moreover, aqueous flexographic ink compositions were similarly prepared using the titanium dioxide pigments (Samples H, M-O) of Comparative Examples 1, 6-8. These compositions were referred to as samples of Comparative Examples 19-22 (Samples w-z).

TABLE 7

| Formulation 5 | Amount (g) |
| --- | --- |
| Sample | 100.0 |
| Aqueous acrylic resin: JONCRYL 501 (manufactured by Johnson Polymer Co.: Solid content 29.5 wt %) | 21.5 |
| Pure Water | 20.7 |
| Anti-foaming agent: SAN NOPCO 8034 (manufactured by San Nopco Co.) | 0.7 |

TABLE 8

| Formulation 6 | Amount (g) |
| --- | --- |
| Dispersion of Formulation 5 | 142.9 |
| Aqueous acrylic resin JONCRYL 501 (manufactured by Johnson Polymer Co.: Solid content 29.5 wt %) | 32.2 |
| Aqueous wax resin JONWAX 26 (manufactured by Johnson Polymer Co.: Solid content 25 wt %) | 8.6 |

Evaluation 5: Evaluation of Opacity

Each of the gravure ink compositions of Examples 12-15 (Samples k-n) and Comparative Examples 15-18 (Samples o-r) was diluted with a mixed solvent of toluene/isopropyl alcohol/methyl ethyl ketone=3/2/5 to a #3 Zahn cup viscosity of 15-16 seconds so as to give a practical printing viscosity. The resulting diluted ink was coated on a PET film using a #16 bar coater and subjected to air-drying for 30 minutes to form a coating film. A black chart paper was overlapped on the back surface of the PET film (the surface on which the coating film was not formed), and reflectance of the coating film (Y value) and b value according to Hunter color indication system were measured using a color computer (SM-7 manufactured by Suga Test Instruments Co., Ltd.). Furthermore, each of the aqueous flexographic ink compositions of Examples 16-19 (Samples s-v) and Comparative Examples 19-22 (Samples w-z) was diluted with pure water to a #4 Zahn cup viscosity of 7-8 seconds so as to give a practical printing viscosity. The resulting diluted ink was coated on a corrugated board using a #16 bar coater and subjected to air-drying for 1 hour to form a coating film. A black chart paper was overlapped on the back surface of the board, and reflectance of the coating film (Y value) and b value according to Hunter color indication system were measured using a color computer (SM-7 manufactured by Suga Test Instruments Co., Ltd.). The results are shown in Table 9. The compositions higher in reflectance were higher in opacity and those smaller in b value had bluish in color tone.

Evaluation 6: Evaluation of Opacity after Lamination

Each of the gravure ink compositions of Examples 15-18 (Samples o-r) and Comparative Examples 19-22 (Samples w-z) was diluted with a mixed solvent of toluene/isopropyl alcohol/methyl ethyl ketone=3/2/5 to a #3 Zahn cup viscosity of 15-16 seconds so as to give a practical printing viscosity. The resulting diluted ink was coated on a PET film using a #4 bar coater and subjected to air-drying for 30 minutes to form a coating film, on which an urethane resin (IB-422 having a solid content of 30% by weight manufactured by Sanyo Kasei Co., Ltd.) was coated by a #16 bar coater. Then, an OPP film was superposed on the coating film. The resulting film was held before a fluorescent lighting, and the degree of transmission was visually judged to evaluate the opacity after lamination. The evaluation criteria are as follows.

(Superior) judgement ○: low transmission of film—judgement X: high transmission of film (inferior)

Evaluation 7: Evaluation of Abrasion of Metal:

500 g of the diluted ink used in the above evaluation 5 was subjected to an abrasion test with 500,000 revolutions using an abrasion tester (AT II manufactured by Karl Shredder Co., Ltd.). Weight of the test plate before and after the test was measured and the metal abrasion was evaluated in terms of the decrement in weight. The ink compositions of the present invention showed nearly the same opacity as that of conventional rutile type titanium dioxide pigments and besides were excellent in metal abrasion which is peculiar to the anatase type titanium dioxide pigments.

TABLE 9

| | Sample | Titanium dioxide pigment | Kind of ink | Opacity (Y value) | Color tone (b value) | Opacity after lamination | Metal abrasion (mg) |
| --- | --- | --- | --- | --- | --- | --- | --- |
| Example 12 | k | Sample A | Solvent type urethane resin | 71 | −3.3 | ○ | 2.6 |
| Example 13 | l | Sample E | Solvent type urethane resin | 73 | −3.3 | ○ | 2.8 |
| Example 14 | m | Sample F | Solvent type urethane resin | 73 | −3.3 | ○ | 2.5 |
| Example 15 | n | Sample G | Solvent type urethane resin | 74 | −3.3 | ○ | 2.9 |

TABLE 9-continued

| Sample | | Titanium dioxide pigment | Kind of ink | Opacity (Y value) | Color tone (b value) | Opacity after lamination | Metal abrasion (mg) |
|---|---|---|---|---|---|---|---|
| Comparative Example 15 | o | Sample H | Solvent type urethane resin | 70 | −4.0 | X | 2.4 |
| Comparative Example 16 | p | Sample M | Solvent type urethane resin | 71 | −4.0 | X | 2.2 |
| Comparative Example 17 | q | Sample N | Solvent type urethane resin | 71 | −3.2 | ◯ | 6.3 |
| Comparative Example 18 | r | Sample O | Solvent type urethane resin | 73 | −3.2 | ◯ | 6.0 |
| Example 16 | s | Sample A | Aqueous acrylic resin | 81 | −0.5 | — | 10.5 |
| Example 17 | t | Sample E | Aqueous acrylic resin | 85 | −0.3 | — | 10.0 |
| Example 18 | u | Sample F | Aqueous acrylic resin | 85 | −0.4 | — | 11.2 |
| Example 19 | v | Sample G | Aqueous acrylic resin | 85 | −0.3 | — | 10.7 |
| Comparative Example 19 | w | Sample H | Aqueous acrylic resin | 80 | −1.4 | — | 10.8 |
| Comparative Example 20 | x | Sample M | Aqueous acrylic resin | 83 | −1.3 | — | 10.2 |
| Comparative Example 21 | y | Sample N | Aqueous acrylic resin | 82 | −0.4 | — | 21.7 |
| Comparative Example 22 | z | Sample O | Aqueous acrylic resin | 86 | −0.3 | — | 21.2 |

4. Examples Relating to Resin Compositions Containing Plastic Resin

Example 20 and Comparative Example 23

A mixture of the following formulation 7 was prepared using the titanium dioxide pigment (Sample B) of Example 2. This mixture was heated and molten using a twin-screw extruder (Labo Plastmill manufactured by Toyo Seiki Mfg. Co., Ltd.; L/D=25, D=20 mmφ) so that the resin temperature reached 280° C., followed by kneading over a period of 1 hour and molding the kneaded product into a film of 50 μm in thickness by a T-die to obtain a resin composition (plastics resin composition) of the present invention containing 1 part by weight of the titanium dioxide pigment for 1 part by weight of the resin component. This was referred to as a sample of Example 20 (Sample-a'). The extrusion opening of the twin-screw extruder was fitted with a screen of 1450 mesh. A plastics resin composition was similarly prepared using the titanium dioxide pigment of Comparative Example 5 (Sample L). This was referred to as a sample of Comparative Example 23 (Sample b').

TABLE 10

| Formulation 7 | Amount (g) |
|---|---|
| Sample | 500 |
| Polyethylene resin SUMIKASEN L-705 (manufactured by Sumitomo Chemical Co., Ltd. Frozen ground material) | 500 |
| Zinc stearate | 20 |

Evaluation 8: Evaluation of Opacity

Transmission (T value) of the polyethylene films of Example 20 and Comparative Example 23 (Samples a' and b') for visible light of 440 nm, 540 nm and 640 nm in wavelength was measured using a spectrophotometer (UV-2200A manufactured by Shimadzu Seisakusho Ltd.). The results are shown in Table 11. The films smaller in T value were superior in opacity.

Evaluation 9: Evaluation of Dispersibility

In molding the polyethylene films of Example 20 and Comparative Example 23 (Samples a' and b') into polyethylene films, resin pressures at the extrusion opening of the extruder before and after kneading were measured. The results are shown in Table 11. Those which were smaller in the difference of the pressure (Δ P) were superior in dispersibility. The plastics resin compositions of the present invention were not only superior in opacity, but also superior in dispersibility to those comprising conventional anatase type titanium dioxide pigments.

TABLE 11

| Sample | Titanium dioxide pigment | Opacity T(%) | | | Dispersibility ΔP (kg/cm$^2$) |
|---|---|---|---|---|---|
| | | 440 nm | 540 nm | 640 nm | |
| Example 20 | a' | Sample B | 8.0 | 11.1 | 14.9 | 10 |
| comparative Example 23 | b' | Sample L | 8.6 | 12.1 | 15.6 | 50 |

INDUSTRIAL APPLICABILITY

The titanium dioxide pigment of the present invention has characteristics peculiar to anatase type, for example, optical characteristics such as bluish color tone and physical characteristics such as low hardness, and furthermore has high opacity not possessed by the conventional anatase type titanium oxide pigments, and hence is useful in various resin compositions, particularly, those which contain resins for paints, inks, plastics or the like.

The invention claimed is:

1. A method for producing an anatase type titanium dioxide pigment comprising, a single calcining step, wherein particles of a hydrous titanium oxide are introduced into a rotary kiln having a temperature of not lower than 800° C. and lower than 1000° C. in the presence of calcination treating agents, said calcination treating agents including an aluminum compound corresponding to 0.02-0.2% by weight calculated as $Al_2O_3$, a potassium compound corresponding to 0.2-1% by weight calculated as $K_2O$ and a phosphoric acid compound corresponding to 0.02-0.5% by weight calculated as $P_2O_5$ based on the weight of $TiO_2$ in the hydrous titanium oxide, the ratio $K_2O/P_2O_5$ being in the range of 1.5/1-10/1.

2. A method for producing a titanium dioxide pigment according to claim 1, wherein the hydrous titanium oxide has a particle diameter of 0.001-0.01 μm.

* * * * *